US011770240B2

(12) United States Patent
Jo et al.

(10) Patent No.: US 11,770,240 B2
(45) Date of Patent: Sep. 26, 2023

(54) ELECTRONIC DEVICE AND METHOD FOR RECEIVING PUSH MESSAGE STORED IN BLOCKCHAIN

(71) Applicant: Samsung Electronics Co., Ltd., Suwon-si (KR)

(72) Inventors: Dohyun Jo, Suwon-si (KR); Youna Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 15/930,915

(22) Filed: May 13, 2020

(65) Prior Publication Data

US 2020/0366471 A1 Nov. 19, 2020

(30) Foreign Application Priority Data

May 13, 2019 (KR) ........................ 10-2019-0055732

(51) Int. Cl.
*H04L 9/08* (2006.01)
*H04L 9/40* (2022.01)
(Continued)

(52) U.S. Cl.
CPC ........ *H04L 9/0822* (2013.01); *H04L 63/0428* (2013.01); *H04L 67/55* (2022.05); *H04L 9/50* (2022.05)

(58) Field of Classification Search
CPC ............ H04L 63/0428; H04L 63/0442; H04L 9/0822; H04L 9/3239; H04L 9/50; H04L 67/55; H04L 67/104; H04L 2209/80
(Continued)

(56) References Cited

U.S. PATENT DOCUMENTS 7,379,548 B2 * 5/2008 Revital .................. H04N 7/165
380/240
8,584,225 B1 * 11/2013 Kennedy ................. H04L 67/34
726/10

(Continued)

FOREIGN PATENT DOCUMENTS

EP        2 892 206 A1    7/2015
KR      10-1837168 B1    3/2018
WO     2019/054779 A1    3/2019

OTHER PUBLICATIONS

Understanding how the Ethereum smart contract works, Jan. 18, 2018 https://opentutorials.org/course/2869/19273.

(Continued)

*Primary Examiner* — Amare F Tabor
(74) *Attorney, Agent, or Firm* — Jefferson IP Law, LLP

(57) ABSTRACT

An electronic device is provided. The electronic device includes a communication circuit configured to communicate, at least one processor operatively connected to the communication circuit, and a memory operatively connected to the at least one processor, wherein the memory may store instructions, when executed, causing the at least one processor to request a management server to encrypt a push key received from a push server, using the communication circuit, in response to the request, receive the encrypted push key from the management server, generate at least one transaction based on the encrypted push key, and transmit the transaction to a blockchain network.

14 Claims, 7 Drawing Sheets

(51) Int. Cl.
*H04L 67/55* (2022.01)
*H04L 9/00* (2022.01)

(58) Field of Classification Search
USPC ........................................................ 713/162
See application file for complete search history.

(56) References Cited

U.S. PATENT DOCUMENTS

| | | | |
|---|---|---|---|
| 10,832,247 B2* | 11/2020 | Durvasula | G06Q 20/389 |
| 10,839,626 B2* | 11/2020 | Spatig | G07C 9/00309 |
| 11,157,622 B2* | 10/2021 | Zhu | H04L 9/0637 |
| 11,194,911 B2* | 12/2021 | Zhu | H04L 9/3247 |
| 2005/0232191 A1 | 10/2005 | Wills | |
| 2018/0336286 A1 | 11/2018 | Shah | |
| 2019/0005469 A1* | 1/2019 | Dhupkar | H04L 9/0637 |
| 2019/0050855 A1* | 2/2019 | Martino | H04L 9/0643 |
| 2019/0075178 A1 | 3/2019 | Onnen et al. | |
| 2019/0221062 A1* | 7/2019 | Spatig | G07C 9/00309 |
| 2020/0051074 A1 | 2/2020 | Suh et al. | |
| 2021/0035061 A1* | 2/2021 | Pashov | G06Q 50/18 |
| 2022/0067033 A1* | 3/2022 | Zhang | G06Q 20/02 |

OTHER PUBLICATIONS

Solidity Programming (2)-Events and Bloom filters, Dec. 14, 2017 https://joojis.tistory.com/entry/Solidity-%ED%94%84%EB%A1%9C%EA%B7%B8%EB%9E%98%EB%B0%8D-2.

European Search Report dated Apr. 14, 2022, issued in European Application No. 20806729.8.

Indian Office Action dated Apr. 29, 2022, issued in Indian Application No. 202127057735.

International Search Report dated Aug. 26, 2020, issued in International Application No. PCT/KR2020/006294.

* cited by examiner

ELECTRONIC DEVICE AND METHOD FOR RECEIVING PUSH MESSAGE STORED IN BLOCKCHAIN

CROSS-REFERENCE TO RELATED APPLICATION(S)

This application is based on and claims priority under 35 U.S.C. § 119(a) of a Korean patent application number 10-2019-0055732, filed on May 13, 2019, in the Korean Intellectual Property Office, the disclosure of which is incorporated by reference herein in its entirety.

BACKGROUND

1. Field

The disclosure relates to an electronic device and a method for receiving a push message stored in a blockchain.

2. Description of Related Art

An electronic device may make a contract with an external electronic device for agreeing to receive a push message, and record contract content in a blockchain. If a condition based on the contract is satisfied, the electronic device may receive a push message according to the contract content recorded in the blockchain, from the external electronic device.

A blockchain network may be referred to as a decentralized computing device which records transactions of cryptocurrency. The blockchain network may record the transaction (hereafter, referred to as a smart contract) including program code in a block, to execute the contract between contracting parties.

Technical objectives that the disclosure intends to achieve are not limited to the above-mentioned technical objectives, and other technical objectives which are not mentioned may be clearly understood by those skilled in the technical field of the disclosure through the following descriptions.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for receiving a push message stored in a blockchain.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to communicate, at least one processor operatively connected to the communication circuit, and a memory operatively connected to the at least one processor, wherein the memory stores instructions, when executed, causing the at least one processor to request a management server to encrypt a push key received from a push server, using the communication circuit, in response to the request, receive the encrypted push key from the management server, generate at least one transaction based on the encrypted push key, and transmit the transaction to a blockchain network.

In accordance with another aspect of the disclosure, an electronic device is provided. The electronic device includes a communication circuit configured to communicate, at least one processor operatively connected to the communication circuit, and a memory operatively connected to the at least one processor, wherein the memory stores instructions, when executed, causing the at least one processor to request a management server to encrypt a push key received from a push server, using the communication circuit, in response to the request, receive the encrypted push key from the management server, and in response to a push event occurrence based on a smart contract, receive a push message associated with the push event from the management server via the push server.

In accordance with another aspect of the disclosure, an electronic device is provided. The electronic device includes a communication circuit configured to communicate, at least one processor operatively connected to the communication circuit, and a memory operatively connected to the at least one processor, wherein the memory stores instructions, when executed, causing the at least one processor to identify a push event related to a smart contract recorded in at least one block managed by a blockchain network, using the communication circuit, decrypt at least one push key related to the push event, and transmit the at least one decrypted push key and a push message to at least one external electronic device corresponding to the at least one decrypted push key, using a push server.

In accordance with another aspect of the disclosure, a computer-readable recording medium records a program for recording an address of at least one external electronic device and an encrypted push key for the at least one external electronic device in a block of a blockchain network, recording a push event in a block of the blockchain network, the push event including the address of the at least one external electronic device, an address of a smart contract, and a push message, recording the push event in the block and then receiving a transmission request of the encrypted push key corresponding to an address of a first external electronic device from a management server, and in response to receiving the transmission request of the encrypted push key, transmitting the encrypted push key corresponding to the address of the first external electronic device, to the management server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
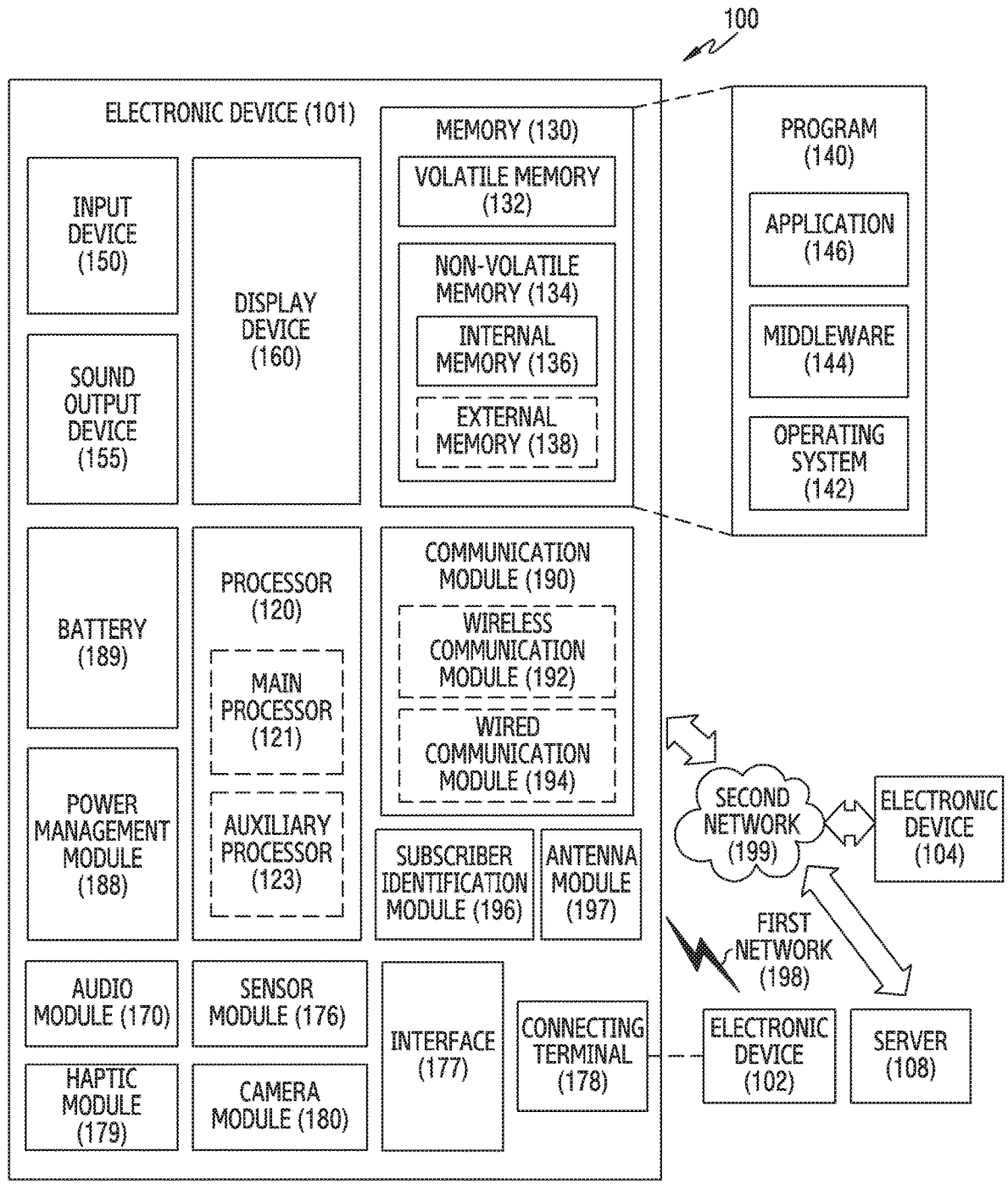
FIG. 1 illustrates a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In an embodiment of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an example embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. According to an embodiment of the disclosure, one or more of the above-described components may be omitted, or one or more other components may be added. Alternatively or additionally, a plurality of components (e.g., modules or programs) may be integrated into a single component. In such a case, according to an embodiment of the disclosure, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

Figure 2A:
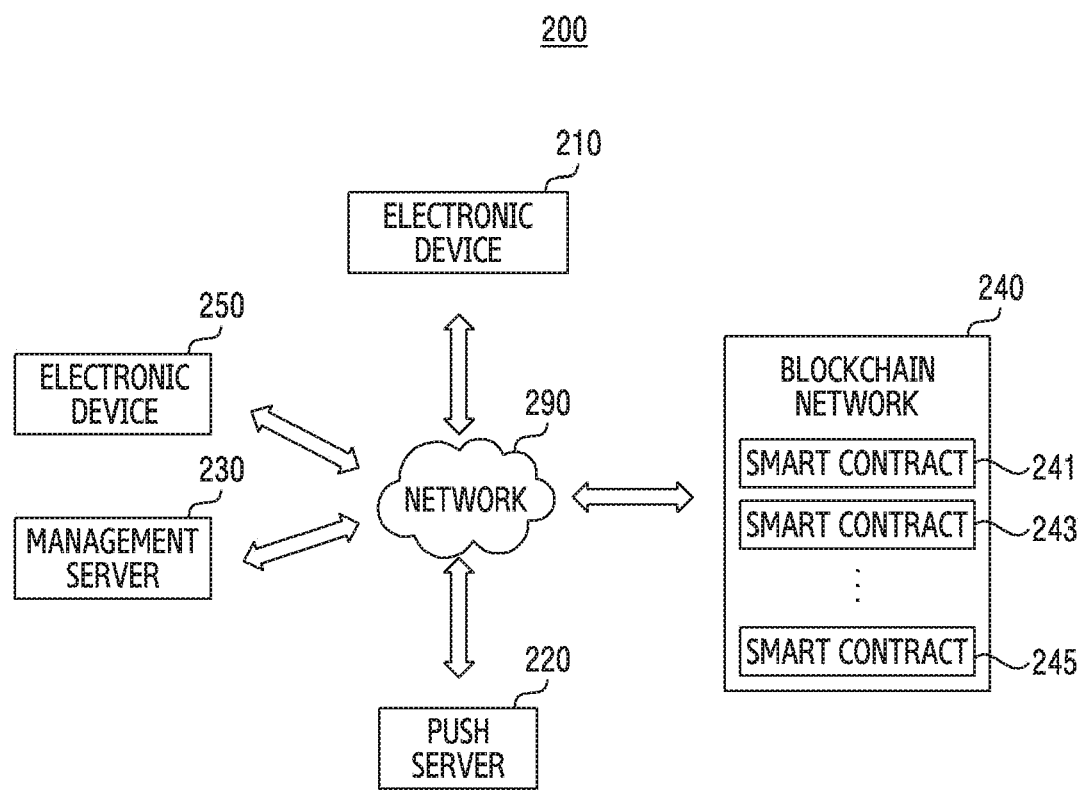
FIG. 2A illustrates a network environment according to an embodiment of the disclosure.

FIG. 2A illustrates a network environment according to an embodiment of the disclosure.

Figure 2B:
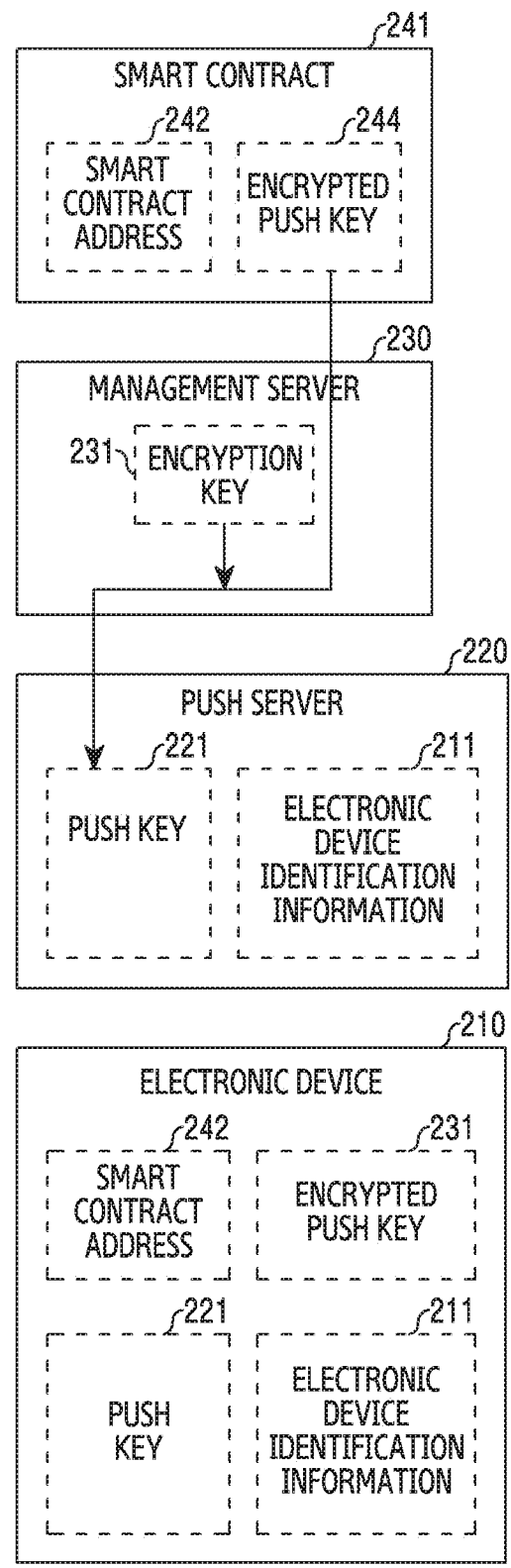
FIG. 2B illustrates data according to an embodiment of the disclosure.

FIG. 2B illustrates data according to an embodiment of the disclosure.

In an embodiment of the disclosure, electronic devices 210 and 250 of FIG. 2A may correspond to the electronic device 101 of FIG. 1. In an embodiment of the disclosure, a push server 220, a management server 230, or their combination of FIG. 2A may correspond to the server 108 of FIG. 1. In an embodiment of the disclosure, a network 290 of FIG. 2A may correspond to the first network 198, the second network 199, or their combination of FIG. 1. In an embodiment of the disclosure, the components of FIG. 2A shall be described by referring to the configuration of the electronic device 101 of FIG. 1.

Referring to FIG. 2A, the electronic devices 210 and 250, the push server 220, the management server 230, and a blockchain network 240 may construct a network environment 200.

Referring to FIG. 2B, a processor (e.g., the processor 120 of FIG. 1) of the electronic device 210 according to an embodiment may identify a request of a running application. In an embodiment of the disclosure, the processor 120 of the electronic device 210 may identify a request indicating consent on at least one smart contract (e.g., a smart contract 241) related to the running application among smart contracts 241, 243, and 245 recorded in blocks managed by the blockchain network 240. In an embodiment of the disclosure, the smart contract 241 may be related to a push service of an arbitrary application. In an embodiment of the disclosure, the request may further include information of an address 242 of the smart contract 241.

In an embodiment of the disclosure, the smart contracts 241, 243, and 245 may include program code written in a designated format. In an embodiment of the disclosure, the smart contracts 241, 243, and 245 may include program code written in a designated language (e.g., Solidity). In an embodiment of the disclosure, the smart contracts 241, 243, and 245 may include program code for recording and executing a contract. In an embodiment of the disclosure, the smart contracts 241, 243, and 245 may include program code for recording a contract related to the push message transmission, and transmitting a push message to electronic devices (e.g., the electronic device 210) of contracting parties. In an embodiment of the disclosure, the smart contracts 241, 243, and 245 may be deployed by the electronic device 250 in the blockchain network 240, and thus recorded in the blocks of the blockchain network 240. In an embodiment of the disclosure, the address 242 of the smart contract 241 may be generated if the smart contract 241 is recorded in the block of the blockchain network 240.

In an embodiment of the disclosure, the processor 120 of the electronic device 210 may identify an agreement request on the smart contract 241 related to the running application. In an embodiment of the disclosure, the processor 120 of the electronic device 210 may display a user interface indicating the agreement request on the smart contract 241 related to the running application, on a display device (e.g., the display device 160 of FIG. 1). In an embodiment of the disclosure, the smart contract 241 related to the running application may be a smart contract related to the push service.

In an embodiment of the disclosure, the processor 120 of the electronic device 210 may identify an input received through the user interface. In an embodiment of the disclosure, the processor 120 of the electronic device 210 may identify the push server 220, in response to the input. In an embodiment of the disclosure, the processor 120 of the electronic device 210 may identify the push server 220 corresponding to the input among a plurality of push servers.

In an embodiment of the disclosure, the processor 120 of the electronic device 210 may request a push key 221 from the push server 220, using a communication module (e.g., the communication module 190 of FIG. 1). In an embodiment of the disclosure, the processor 120 of the electronic device 210 may transmit to the push server 220 a push key request including identification information 211 of the electronic device 210. In an embodiment of the disclosure, the push key 221 may be referred to as a push token. In an embodiment of the disclosure, the push key 221 may be data for identifying the electronic device 210 to which the push server 220 is to transmit a push message.

In an embodiment of the disclosure, the processor 120 of the electronic device 210 may receive the push key 221 from the push server 220, using the communication module 190. In an embodiment of the disclosure, the processor 120 of the electronic device 210 may receive the push key 221 generated by the push server 220 in response to the push key request, from the push server 220. In an embodiment of the disclosure, the electronic device 210 may store the push key 221.

In an embodiment of the disclosure, the processor 120 of the electronic device 210 may request the management server 230 to encrypt the push key 221, using the communication module 190. In an embodiment of the disclosure, the processor 120 of the electronic device 210 may transmit to the management server 230 a push key encryption request including the push key 221, the address 242 of the smart contract 241, or their combination. In an embodiment of the disclosure, the push key encryption request may further include an identifier of the push server 220.

In an embodiment of the disclosure, the processor 120 of the electronic device 210 may receive an encrypted push key 231 from the management server 230, using the communication module 190. In an embodiment of the disclosure, the processor 120 of the electronic device 210 may receive a push key 244 encrypted by the management server 230 in response to the push key encryption request, from the management server 230. In an embodiment of the disclosure, the electronic device 210 may store the encrypted push key 244.

In an embodiment of the disclosure, the management server 230 may encrypt the push key in response to the push key encryption request, and transmit the encrypted push key 244 to the electronic device 210. In an embodiment of the disclosure, the management server 230 may encrypt the push key based on an encryption key corresponding to the address 242 of the smart contract 241. The management server 230 may encrypt the push key based on an encryption key 231 corresponding to the identifier of the push server 220, the address 242 of the smart contrast 241, or their combination, among a plurality of encryption keys. In an embodiment of the disclosure, the management server 230 may encrypt the push key based on the encryption key 231 by way of example. In an embodiment of the disclosure, the management server 230 may encrypt the push key using a reversible crypto system for decrypting the encrypted push key with the original push key. In an embodiment of the disclosure, the management server 230 may encrypt the push key, based on a symmetric crypto system. In an embodiment of the disclosure, the management server 230 may encrypt the push key using a key (e.g., a secret key) based on the symmetric crypto system, and decrypt the encrypted push key with the same key. In an embodiment of the disclosure, the management server 230 may encrypt the push key, based on an asymmetric crypto system. In an embodiment of the disclosure, the management server 230 may a pair of keys according to the asymmetric crypto system. The management server 230 may generate a first key (a private key) and a second key (a public key), encrypt the push key based on the first key (the public key), and decrypt the encrypted push key, based on the second key (the private key) of the key pair.

In an embodiment of the disclosure, the electronic device 210 requests the push key 221 from the push server 220, and directly requests the management server 230 to encrypt the push key by way of example. In an embodiment of the disclosure, the electronic device 210 may request the push key 221 and the encrypted push key 244 from the push server 220. In an embodiment of the disclosure, the push server 220 may generate the push key 221 in response to the push key request, and request the management server 230 to encrypt the generated push key 221. In an embodiment of the disclosure, the push server 220 may transmit the encrypted push key 244 received from the management server 230, to the electronic device 210. In an embodiment of the disclosure, the electronic device 210 may request the push key 221 from the push server 220, and also transmit the address 242 of the smart contract 241.

In an embodiment of the disclosure, the processor 120 of the electronic device 210 may transmit to the blockchain network 240 a transaction for the record as the contracting party of the smart contract 241, using the communication module 190. In an embodiment of the disclosure, the processor 120 of the electronic device 210 may transmit to the blockchain network 240 the transaction for the record as the contracting party including a user address (e.g., user's electronic mail address for the blockchain network 240), the encrypted push key 231, an instruction set corresponding to the smart contract 241, the address 242 of the smart contract 241, and their combination.

In an embodiment of the disclosure, after the transaction for the record as the contracting party is recorded in the block of the blockchain network 240, the processor 120 of the electronic device 210 may receive a push message according to the smart contract 241 via the push server 220 and the management server 230, using the communication module 190.

In an embodiment of the disclosure, the blockchain network 240 may identify a push event. In an embodiment of the disclosure, the blockchain network 240 may identify a program code execution request of a smart contract (e.g., the smart contract 241), based on an execution request of other smart contract (e.g., the smart contract 243). In an embodiment of the disclosure, the blockchain network 240 may receive the program code execution request of the smart contract (e.g., the smart contract 241) from the electronic device 250. In an embodiment of the disclosure, the blockchain network 240 may identify the program code execution request as the push event. In an embodiment of the disclosure, the program code execution request may include the push message, the address of the smart contract 241, the address of the contracting party, or their combination. In an embodiment of the disclosure, identifying the push event at the blockchain network 240 may be understood as identifying the push event at the nodes (e.g., the electronic device 102 and 104, and the server 108 of FIG. 1) participating the blockchain network 240.

In an embodiment of the disclosure, the blockchain network 240 may execute the program code of the smart contract 241 corresponding to the push event, in response to identifying the push event. In an embodiment of the disclosure, the blockchain network 240 may record the execution result of the smart contract 241 corresponding to the push event, in the block. In an embodiment of the disclosure, the blockchain network 240 may record a push event log based on the execution result of the smart contract 241 corresponding to the push event, in the block. In an embodiment of the disclosure, the execution result of the smart contract 241 may include the push message, the address of the smart contract 241, the address of the contracting party, or their combination. In an embodiment of the disclosure, executing the program code at the blockchain network 240 may be understood as executing the program code at the nodes (e.g., the electronic device 102 and 104, and the server 108 of FIG. 1) participating the blockchain network 240.

In an embodiment of the disclosure, the management server 230 may identify the event log based on the data recorded in the blocks of the blockchain network 240. In an embodiment of the disclosure, the management server 230 may identify the event log based on the address of the smart contract 241 among the data recorded in the blocks. In an embodiment of the disclosure, the management server 230 may identify the push event log, based on information indicating a type of the event log among a plurality of event logs.

In an embodiment of the disclosure, in response to identifying the push event log, the management server 230 may request the encrypted push key 244 from the blockchain network 240. In an embodiment of the disclosure, in response to identifying the push event log, the management server 230 may request the encrypted push key 244 corresponding to the address of the contracting party from the blockchain network 240.

In an embodiment of the disclosure, the management server 230 may obtain the encrypted push key 244 corresponding to the address of the contracting party based on the transaction for the record as the contracting party of the smart contract 241, from the blockchain network 240.

In an embodiment of the disclosure, the management server 230 may decrypt the encrypted push key 244 based on the encryption key 231 corresponding to the encrypted push key 244.

In an embodiment of the disclosure, the management server 230 may identify the push server 220 based on the push key 221, the address 242 of the smart contract 241, the encrypted push key 244, or their combination. In an embodiment of the disclosure, the management server 230 may request the push server 220 to transmit a push message. In an embodiment of the disclosure, the push message transmission request may include the push message, the decrypted push key 221, or their combination.

In an embodiment of the disclosure, the push server 220 may receive the push message transmission request from the management server 230. In an embodiment of the disclosure, the push server 220 may receive the push message transmission request including the push message, the decrypted push key 221, or their combination, from the management server 230.

In an embodiment of the disclosure, the push server 220 may identify the electronic device 210, based on the decrypted push key 221. In an embodiment of the disclosure, the push server 220 may identify the electronic device 210 having the identification information 211 matched to the decrypted push key 221. In an embodiment of the disclosure, the push server 220 may transmit the push message to the electronic device 210.

In an embodiment of the disclosure, the electronic device 210 may receive the push message according to the smart contract 241 via the push server 220, using the communication module 190.

In an embodiment of the disclosure, the electronic device 250 may be a device of a developer who programs the application and the smart contracts 241, 243 and 245 corresponding to the application.

In an embodiment of the disclosure, the electronic device 250 may deploy a smart contract (e.g., the smart contract 241) in the blockchain network 40, wherein the blockchain network 240 records the smart contract 241 in the block. In an embodiment of the disclosure, Table 1 may show an example of the smart contract.

TABLE 1

```
pragma solidity ^0.5.4;
interface ERCPush
    {
    event Push(address[ ] indexed_to, address indexed_operator, string_msg);
        function registerKey(string_encPushKey) public returns (bool result);
        function getKey(address_to) public returns (string encPushKey);
        function sendPush(address[ ]_to, address_operator, string_msg) external returns (bool result);
    }
``` pragma solidity ^0.5.4 of Table 1 may be program code for indicating the programming language (Solidity) and definition of its version 0.5.4.

interface ERCPush of Table 1 may be program code for indicating interface definition ERCPush. The interface ERCPush of Table 1 may be include the program code for indicating definition of the Push event, definition of registerKey function, definition of getKey function, definition of sendPush function, or a combination thereof.

In an embodiment of the disclosure, event Push of Table 1 may be program code for defining the Push event. In an embodiment of the disclosure, event Push of Table 1 may include data address[ ] indexed_to indicating addresses of the contracting parties, data address indexed_operator indicating the address of the smart contract, data string_msg indicating the push message, and a combination thereof.

In an embodiment of the disclosure, function registerKey of Table 1 may be program code for defining registerKey function. In an embodiment of the disclosure, the registerKey function may define a function for the electronic device 210 for requesting the record of the contracting party of the smart contract 241. In an embodiment of the disclosure, function registerKey of Table 1 may include data string_encPushKey indicating the encrypted push key of the contracting party. In an embodiment of the disclosure, public of the registerKey function may indicate that the execution result of the registerKey function may be accessed to outside. In an embodiment of the disclosure, returns (bool result) of the registerKey function may indicate a return value according to the execution result of the registerKey function.

In an embodiment of the disclosure, to record as the contracting parity of the smart contract 241 in the block of the blockchain network 240, the electronic device 210 may request the blockchain network 240 to execute the registerKey function including the encrypted push key obtained from the management server 230.

In an embodiment of the disclosure, function getKey of Table 1 may be program code for defining getKey function. In an embodiment of the disclosure, the getKey function may define a function for the management server 230 to request the encryption for the contracting party address identifiable in the event log. In an embodiment of the disclosure, function getKey of Table 1 may include data address_to indicating the address of the contracting party. In an embodiment of the disclosure, public of the getKey function may indicate that an execution result of the getKey function is accessible to outside. In an embodiment of the disclosure, returns string encPushKey of the getKey function may indicate that the encrypted push key corresponding to the address of the contracting party is returned according to the execution result of the getKey function.

In an embodiment of the disclosure, the management server 230 may request the blockchain network 240 to execute the getKey function, based on the push event log recorded in the block of the blockchain network 240. In an embodiment of the disclosure, the management server 230 may request the blockchain network 240 to execute the getKey function which requests to return the encrypted push key corresponding to the address of the contracting party in the push event log.

In an embodiment of the disclosure, function sendPush of Table 1 may be program code for defining sendPush function. In an embodiment of the disclosure, the sendPush function may define the function for a manger of the smart contract 241 to request the blockchain network 240 to execute the push event. In an embodiment of the disclosure, function sendPush of Table 1 may include data address[ ]_to indicating the addresses of the contracting parties, data address_operator indicating the address of the smart contract, data string_msg indicating the push message, and a combination thereof. In an embodiment of the disclosure, external of the sendPush function may indicate that the execution result of the sendPush function is accessible to outside. In an embodiment of the disclosure, returns (string encPushKey) of the sendPush function may indicate a return value according to the execution result of the sendPush function.

In an embodiment of the disclosure, function sendPush may include emit Push. In an embodiment of the disclosure, emit Push may be program code for recording the execution result of sendPush in the event log.

In an embodiment of the disclosure, the electronic device 250 may request the blockchain network 240 to execute the sendPush function to record the push event in the block of the blockchain network 240. In an embodiment of the disclosure, the electronic device 250 may request the blockchain network 240 to execute the sendPush function including the addresses of the contracting parties, the address of the smart contract, the push message, or their combination.

In an embodiment of the disclosure, the electronic device 250 may request the management server 230 to manage the push event of the smart contract 241 based on the address of the smart contract 241 generated by deploying to the blockchain network 240. In an embodiment of the disclosure, the push event management request may include the data indicating the smart contract 241, the address of the smart contract 241, or a combination thereof.

In an embodiment of the disclosure, the management server 230 may verify the smart contract 241 based on the data indicating the smart contract 241. In an embodiment of the disclosure, the management server 230 may verify the smart contract 241, by identifying whether the smart contract 241 is generated in a designated format defined by the management server 230.

In an embodiment of the disclosure, if the smart contract 241 is verified, the management server 230 may generate the encryption key for the smart contract 241. In an embodiment of the disclosure, the management server 230 may match and store the encryption key for the smart contract 241 with the address of the smart contract 241.

In an embodiment of the disclosure, in response to verifying the smart contract 241, the management server 230 may transmit an ack response for the push event management request to the electronic device 250.

In an embodiment of the disclosure, the management server 230 may monitor the push event log related to the smart contract 241 recorded in the blockchain network 240. In an embodiment of the disclosure, in response to identifying the push event log related to the smart contract 241, the management server 230 may transmit a push message according to the push event log to an electronic device (e.g., the electronic device 210) of the contracting party.

Figure 3:
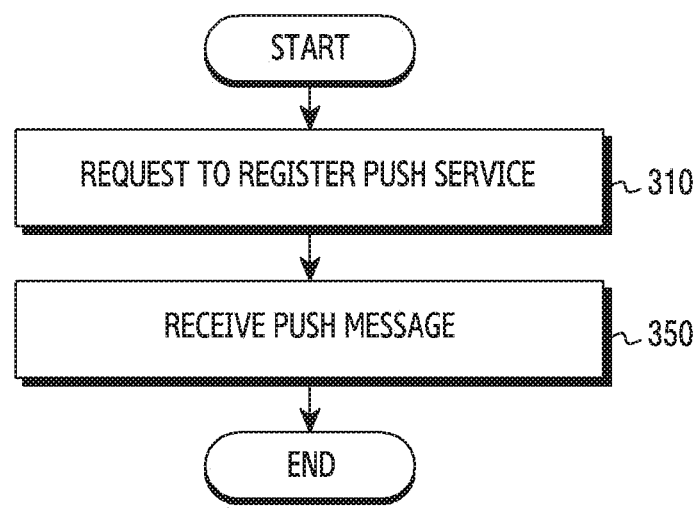
FIG. 3 illustrates a flowchart of operations of an electronic device according to an embodiment of the disclosure.

FIG. 3 illustrates a flowchart of operations of an electronic device according to an embodiment of the disclosure. In an embodiment of the disclosure, operations of FIG. 3 shall be described by referring to the components of FIG. 2A.

Referring to FIG. 3, in operation 310, the electronic device 210 may request a blockchain network (e.g., the blockchain network 240 of FIG. 2A) to request a push service. In an embodiment of the disclosure, the electronic device 210 may generate a smart contract (e.g., the smart contract 241 of FIG. 2A) to be executed if a node of the blockchain network 240 satisfies a particular condition. For example, the smart contract may be included as code in a transaction and transmitted to the blockchain network 240, and if a particular event of the smart contract occurs, and the electronic device 210 may register the push service for receiving a push message via the push server 220. For doing so, the electronic device 210 may request to register the push service, by transmitting the smart contract including instructions for the push event to the blockchain network 240. In an embodiment of the disclosure, the transaction may include a user's address, an encrypted push key, an instruction set corresponding to the smart contract, an address of the smart contract 241, or their combination. In an embodiment of the disclosure, the push key may be data for identifying an electronic device to which the push server 220 (e.g., a Google push server, etc.) is to transmit a push message. In an embodiment of the disclosure, data generated by a management server (e.g., the management server 230 of FIG. 2A) by encrypting the push key based on an encryption key corresponding to the contract 241 may be used as the push data. In an embodiment of the disclosure, the push key may be data generated by a push server (e.g., the push server 220 of FIG. 2A).

In an embodiment of the disclosure, in response to requesting to register the push service, the blockchain network 240 may transmit the transaction to one or more nodes of the blockchain network 240, and the transaction validated by the nodes may be included in a new block which is linked to old blocks.

Referring to FIG. 3, in operation 350, the electronic device 210 may receive a push message corresponding to the recognized push event, from the management server 230 via the push server 220. In an embodiment of the disclosure, the push message may be recorded in a push event log if the blockchain network 240 executes program code of the smart contract 241 corresponding to the push event. In an embodiment of the disclosure, the management server 230 may identify the push event log, and transmit a push message recorded in the push event log to the push server 220 which issues the push key. In an embodiment of the disclosure, the push server 220 may identify the electronic device 210 based on the push key, and transmit the push message to the identified electronic device 210.

Figure 4:
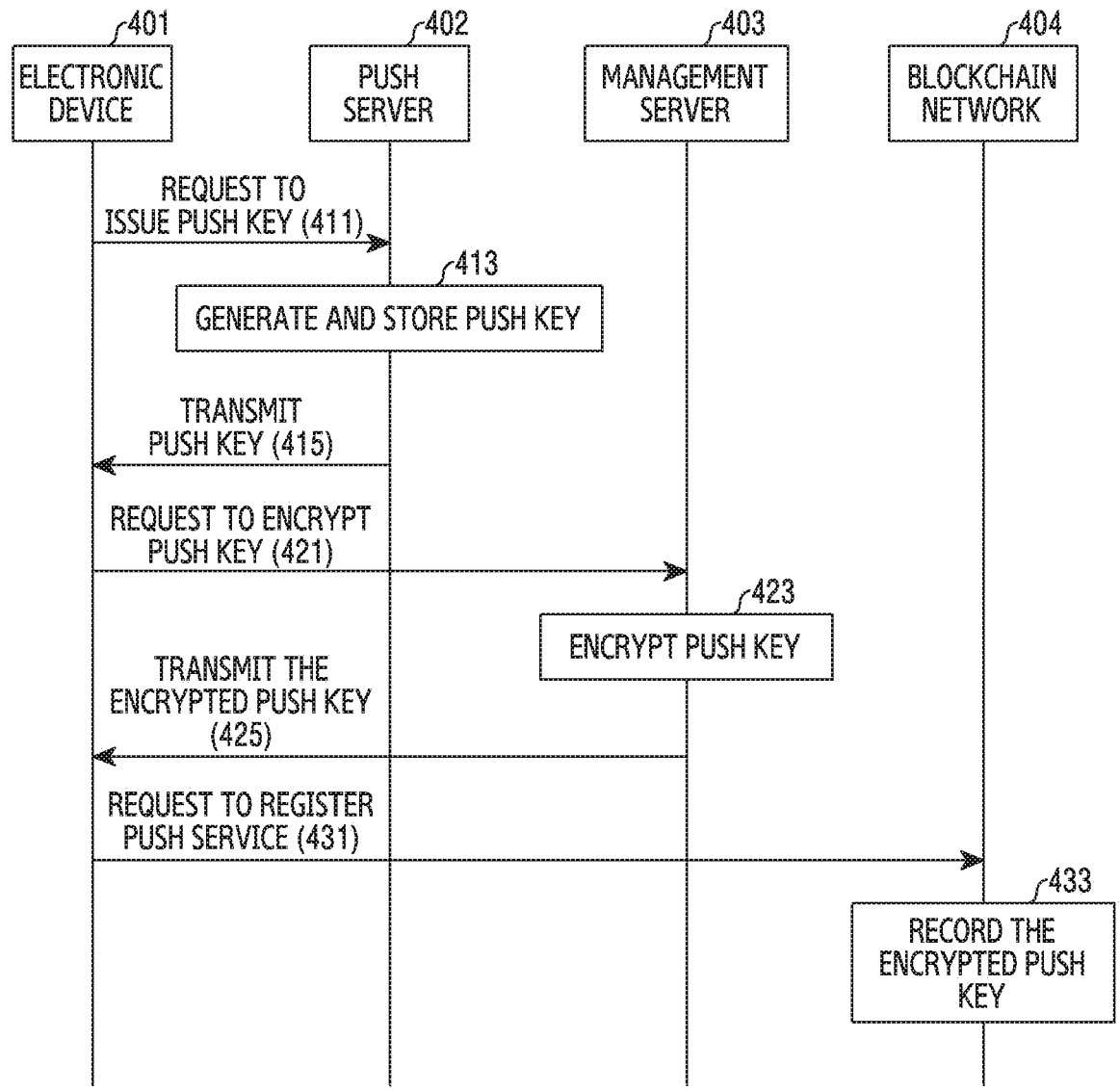
FIG. 4 illustrates a flowchart of operations of an electronic device according to an embodiment of the disclosure.

FIG. 4 illustrates a flowchart of operations of an electronic according to an embodiment of the disclosure. In an embodiment of the disclosure, operations of FIG. 4 may be included in operation 310 of FIG. 3. In an embodiment of the disclosure, an electronic device 401, a push server 402, a management server 403, or a blockchain network 404 of FIG. 4 may correspond to the electronic device 210, the push server 220, the management server 230, or the blockchain network 240 of FIG. 2A respectively. In an embodiment of the disclosure, the operations of FIG. 4 shall be described by referring to the components of FIG. 2A.

Referring to FIG. 4, in operation 411, the electronic device 401 may request the push server 402 to issue a push key. In an embodiment of the disclosure, in response to an input received through a user interface, the electronic device 401 may request the push server 402 corresponding to the input among a plurality of push servers, to issue the push key. In an embodiment of the disclosure, the user interface may be displayed by the electronic device 401 on a display device (e.g., the display device 160 of FIG. 1), in response to a request indicating agreement on a smart contract (e.g., the smart contract 241 of FIG. 2A) of an application.

Referring to FIG. 4, in operation 413, in response to the push key issue request, the push server 402 may generate a push key and store the generated push key. In an embodiment of the disclosure, the push server 402 may match and store the generated push key with identification information (e.g., IP address, device ID) of the electronic device 401. In an embodiment of the disclosure, the push key may be referred to as a push token.

Referring to FIG. 4, in operation 415, the push server 402 may transmit the generated push key to the electronic device 401.

Referring to FIG. 4, in operation 421, the electronic device 401 may request the management server 403 to encrypt the push key. In an embodiment of the disclosure, in response to an input received through the user interface, the electronic device 401 may request the management server 403 corresponding to the input among a plurality of management servers, to encrypt the push key.

In an embodiment of the disclosure, the electronic device 401 may transmit to the management server 403 a push key encryption request including the address of the smart contract 241, identification information of the push server 402 which issues the push key, or their combination.

Referring to FIG. 4, in operation 423, in response to the push key encryption request, the management server 403 may encrypt the push key. In an embodiment of the disclosure, the management server 403 may not store the identification information of the electronic device 401.

In an embodiment of the disclosure, the management server 403 may encrypt the push key using an encryption key corresponding to the address of the smart contract 241, the push server 402, or their combination. In an embodiment of the disclosure, the management server 403 may manage one encryption key corresponding to the address of the smart contract 241, or one or more encryption keys corresponding to the address of the smart contract 241. In an embodiment of the disclosure, the management server 403 may correspond the one or more encryption keys corresponding to the address of the smart contract 241, to a plurality of push servers respectively. In an embodiment of the disclosure, the management server 403 may match, store, and manage the encryption key with a plurality of applications (e.g., distributed application (dapp)) according to a request of each application (e.g., dapp) of an external electronic device (e.g., the electronic device 210 of FIG. 2A). In an embodiment of the disclosure, if receiving a push key encryption request of an arbitrary application from the external electronic device (e.g., the electronic device 210 of FIG. 2A), the management server 403 may encrypt the push key using the encryption key corresponding to the application, and the encrypted push key may be stored through a node of the blockchain network 240 at a request of the external electronic device (e.g., the electronic device 210 of FIG. 2A).

Referring to FIG. 4, in operation 425, the management server 403 may transmit the encrypted push key to the electronic device 401.

Referring to FIG. 4, in operation 431, the electronic device 401 may transmit a push service registration request to the blockchain network 404. In an embodiment of the disclosure, the electronic device 401 may generate a transaction including the address of the smart contract 241, the encrypted push key, the address of the electronic device 401 (or the user address of the electronic device 401), or their combination, transmit the generated transaction to the blockchain network 404, and thus transmit the push service registration request to the blockchain network 404. In an embodiment of the disclosure, the transaction may indicate agreement on the smart contract 241.

In an embodiment of the disclosure, generating the transaction may include digital signing information in the transaction (e.g., a recipient address, an amount, a smart contract, etc.) using a private key stored in a memory (e.g., the memory 130 of FIG. 1) of the electronic device 401. In an embodiment of the disclosure, the electronic device 401 may transmit the push service registration request to the blockchain network 404, by transmitting the transaction to the blockchain network 404. In an embodiment of the disclosure, the blockchain network 404 may verify the transaction, based on a public key corresponding to the private key. In an embodiment of the disclosure, in response to verifying that the user signs the transaction of the electronic device 401, the blockchain network 404 may record the transaction in the block. In an embodiment of the disclosure, the electronic device 401 may use the private key stored in a device (e.g., a USB storage device, a USB on-the-go (OTG) storage device) electrically connected to the electronic device 401, for the digital signage to create the transaction. In an embodiment of the disclosure, a wallet address of the blockchain network 404 of the user may be generated based on the public key corresponding to the private key.

In an embodiment of the disclosure, the electronic device 401 may generate a key pair (the private key-public key pair) based on a root seed of the blockchain network 404. In an embodiment of the disclosure, the electronic device 401 may generate the key pair, using an algorithm (e.g., Rivest-Shamir-Adleman (RSA), Elliptic Curve Cryptography (ECC)). In an embodiment of the disclosure, the RSA and the ECC are merely examples of the algorithm for creating the key pair, and the disclosure is not limited thereto. In an embodiment of the disclosure, the electronic device 401 may generate the key pair, using other algorithm than the RSA or the ECC. In an embodiment of the disclosure, the root seed may indicate a value randomly generated in an available range in the blockchain network 404. In an embodiment of the disclosure, the electronic device 401 may generate the root seed from dynamic characteristics or a unique value of the configuration in the electronic device 401.

Referring to FIG. 4, in operation 433, the blockchain network 404 may record the encrypted push key in the block of the blockchain network 404, in response to the push service registration request. In an embodiment of the disclosure, the blockchain network 404 may record the encrypted push key, by recording the transaction from the electronic device 401 in the block of the blockchain network 404.

Figure 5:
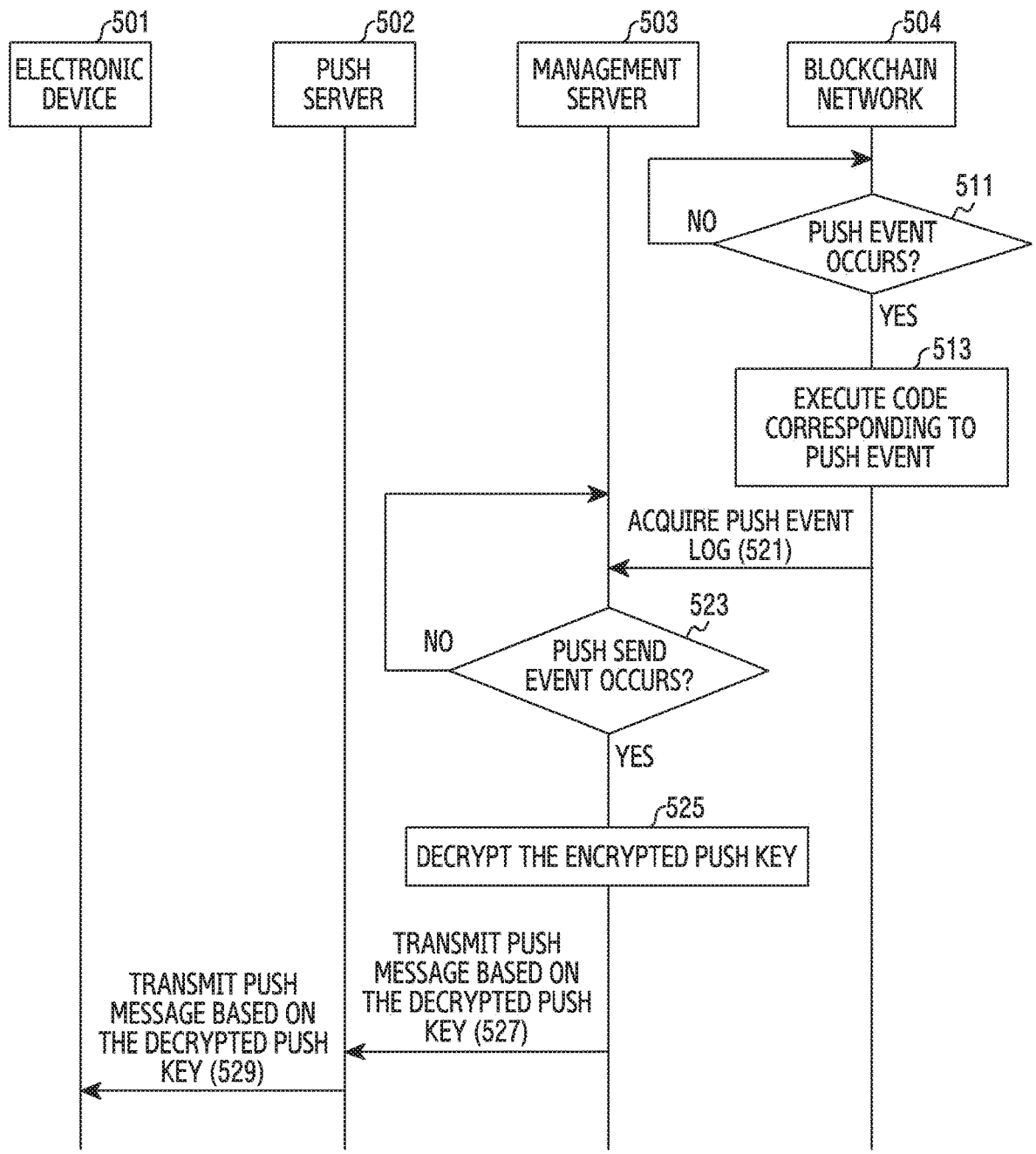
FIG. 5 illustrates a flowchart of operations of an electronic device according to an embodiment of the disclosure.

FIG. 5 illustrates a flowchart of operations of an electronic device according to an embodiment of the disclosure. In an embodiment of the disclosure, operations of FIG. 5 may be included in operation 350 of FIG. 3. In an embodiment of the disclosure, an electronic device 501, a push server 502, a management server 503, or a blockchain network 504 of FIG. 5 may correspond to the electronic device 210, the push server 220, the management server 230, or the blockchain network 240 of FIG. 2A respectively. In an embodiment of the disclosure, the operations of FIG. 5 shall be described by referring to the components of FIG. 2A.

Referring to FIG. 5, in operation 511, the blockchain network 504 may identify push event occurrence. In an embodiment of the disclosure, the blockchain network 504 may identify a program code execution request of a smart contract (e.g., the smart contract 241) based on an execution result of another smart contract (e.g., the smart contract 243). In an embodiment of the disclosure, the blockchain network 504 may invoke the smart contract (e.g., the smart contract 241), in response to identifying the program code execution request of the smart contract (e.g., the smart contract 241). In an embodiment of the disclosure, the blockchain network 504 may identify the push event based on the program code execution request. In an embodiment of the disclosure, the blockchain network 504 may receive the program code execution request of the smart contract 241 from an application manager (e.g., the electronic device 250 of FIG. 2A) related to the smart contract 241. In an embodiment of the disclosure, the management server 504 may identify the push event based on the program code execution request. In an embodiment of the disclosure, the program code execution request may include a push message, an address of the smart contract 241, an address of a contracting party, or a combination thereof.

Referring to FIG. 5, if identifying the push event occurrence (YES) in operation 511, the blockchain network 504 may perform operation 513. If not identifying the push event occurrence (NO) in operation 511, the blockchain network 504 may redo operation 511.

Referring to FIG. 5, in operation 513, the blockchain network 504 may execute program code corresponding to the push event. In an embodiment of the disclosure, the blockchain network 504 may execute the program code of the smart contract 241 corresponding to the push event, and record an execution result in a block of the blockchain network 504. In an embodiment of the disclosure, the execution result of the smart contract 241 may include the push message, the address of the smart contract 241, the address of the contracting party, or a combination thereof.

Referring to FIG. 5, in operation 521, the management server 503 may acquire a push event log from the blockchain network 504. In an embodiment of the disclosure, the management server 503 may periodically acquire the event log from the blockchain network 504. In an embodiment of the disclosure, the management server 503 may acquire the event log based on data recorded in the blocks of the blockchain network 504. In an embodiment of the disclosure, the management server 503 may acquire the event log based on the address of the smart contract 241 of the data recorded in the blocks of the blockchain network 504. In an embodiment of the disclosure, the management server 503 may identify the event log of the smart contract 241 which generates the push event with the address of the smart contract 241 of the event log, and acquire the push event log from a plurality of event logs, further based on information indicating the type of the event in the event log.

Referring to FIG. 5, in operation 523, the management server 503 may identify occurrence of a push request event, based on the acquired push event log. In an embodiment of the disclosure, if acquiring a new push event log, the management server 503 may identify occurrence of the push request event.

In an embodiment of the disclosure, in response to identifying the occurrence of the push request event, the management server 503 may acquire an encrypted push key corresponding to the address of the contracting party in the push event log, from the blockchain network 504. In an embodiment of the disclosure, the management server 503 may request the blockchain network 504 to execute the program code of the smart contract 241 to acquire the encrypted push key corresponding to the address of the contracting party. In an embodiment of the disclosure, the management server 503 may acquire the encrypted push key, by obtaining an execution result of the program code of the smart contract 241 from the blockchain network 504.

Referring to FIG. 5, if identifying the push event occurrence (YES) in operation 523, the blockchain network 504 may perform operation 525. If not identifying the push event occurrence (NO) in operation 523, the blockchain network 504 may redo operation 521.

Referring to FIG. 5, in operation 525, the management server 503 may decrypt the encrypted push key, in response to identifying the push request event. In an embodiment of the disclosure, the management server 503 may decrypt the encrypted push key, based on the encryption key corresponding to the address of the smart contract 241, the encrypted push key, or their combination.

In an embodiment of the disclosure, the management server 503 may identify the push server 502 among a plurality of push servers, based on the address of the smart contract 241, the encrypted push key, the decrypted push key, or their combination.

Referring to FIG. 5, in operation 527, the management server 503 may transmit a push message based on the decrypted push key, to the push server 502. In an embodiment of the disclosure, the management server 503 may transmit the push message including the decrypted push key to the push server 502.

In an embodiment of the disclosure, the push server 502 may identify the electronic device 501 among a plurality of electronic devices, based on the decrypted push key.

Referring to FIG. 5, in operation 529, the push server 502 may transmit the push message based on the decrypted push key, to the electronic device 501.

Figure 6:
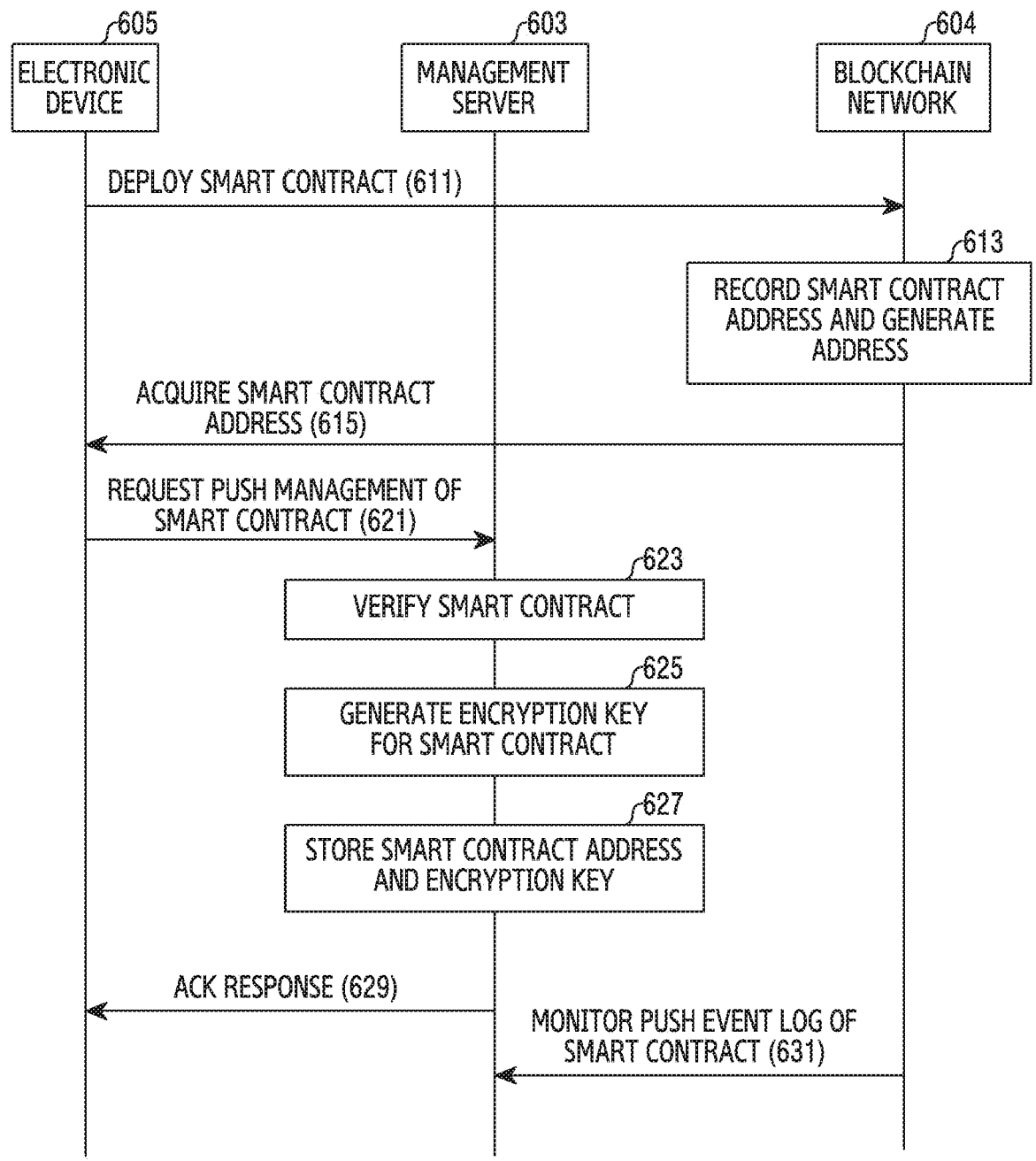
FIG. 6 illustrates a flowchart of operations of an electronic device according to an embodiment of the disclosure.

FIG. 6 illustrates a flowchart of operations of an electronic device according to an embodiment of the disclosure. In an embodiment of the disclosure, an electronic device 605, a management server 603, or a blockchain network 604 of FIG. 6 may correspond to the electronic device 250, the management server 230, or the blockchain network 240 of FIG. 2A respectively. In an embodiment of the disclosure, the operations of FIG. 6 shall be described by referring to the components of FIG. 2A.

Referring to FIG. 6, in operation 611, the electronic device 605 may deploy a smart contract (e.g., the smart contract 241 of FIG. 2A) in the blockchain network 604, wherein the blockchain network 604 records the smart contract 241 in its block. In an embodiment of the disclosure, the smart contract 241 may be program code written by the management server 603 in a designated format to process a request according to an event of the smart contract 241.

In an embodiment of the disclosure, the smart contract 241 may be a smart contract for an event of a service (e.g., an application, a web site, or their combination) programmed by the user of the electronic device 605. In an embodiment of the disclosure, the event of the service (e.g., an application, a web site, or their combination) may be a push event.

In an embodiment of the disclosure, the smart contract 241 may include at least program code for defining the push event, program code for registering the encrypted push key, program code for acquiring the encrypted key based on an address of a contracting party, program code for requesting to transmit a push message, or a combination thereof. In an embodiment of the disclosure, the program code for requesting to transmit the push message may include program code for requesting to record the push event occurrence in a push event log of the blockchain network 604.

Referring to FIG. 6, in operation 613, the blockchain network 604 may record the smart contract 241 in the block, in response to deploying of the electronic device 605. In an embodiment of the disclosure, the blockchain network 604 may generate an address of the smart contract 241, and also record the address of the smart contract 241 in the block.

Referring to FIG. 6, in operation 615, the electronic device 605 may obtain the address of the smart contract 241, by identifying the block of the blockchain network 604.

Referring to FIG. 6, in operation 621, the electronic device 605 may request push management of the smart contract 241 from the management server 603. In an embodiment of the disclosure, the push management may be a series of operations for identifying the push event log recorded in the block of the blockchain network 604, and transmitting a push message based on the push event log to an electronic device (e.g., the electronic device 210 of FIG. 2A). In an embodiment of the disclosure, the electronic device 605 may transmit a push management request including the address of the smart contract 241 to the management server 603.

Referring to FIG. 6, in operation 623, the management server 603 may verify the smart contract 241. In an embodiment of the disclosure, the management server 603 may verify the smart contract 241, by identifying whether the smart contract 241 is written in the designated format.

Referring to FIG. 6, in response to verifying the smart contract 241, the management server 603 may generate an encryption key for the smart contract in operation 625. In an embodiment of the disclosure, the management server 603 may generate one or more encryption keys for the smart contract.

Referring to FIG. 6, in response to generating the encryption key, the management server 603 may match and store the address of the smart contract 241 and the encryption key in operation 627.

Referring to FIG. 6, in response to storing the encryption key, the management server 603 may transmit an ack response for the push management request to the electronic device 605 in operation 629. In an embodiment of the disclosure, in response to the ack response of the management server 603, the electronic device 605 may set authority of the smart contract 241 for the management server 603. In an embodiment of the disclosure, the authority of the smart contract 241 may include authority for acquiring the encrypted push key based on the address of the contracting party, authority for acquiring the event log of the smart contract 241, or a combination thereof.

Referring to FIG. 6, in operation 631, the management server 603 may monitor the event log of the smart contract 241 from the blockchain network 604. In an embodiment of the disclosure, the management server 603 may monitor the event log, based on the address of the smart contract 241. In an embodiment of the disclosure, the management server 603 may monitor the push event log among a plurality of event logs of the smart contract 241, based on information indicating a type of the event log.

As set forth above, an electronic device and a method according to an embodiment may distribute and store user's personal information in a plurality of servers, without centralizing the personal information.

As set forth above, an electronic device according to an embodiment may include a communication circuit configured to communicate, a processor operatively connected to the communication circuit, and a memory operatively connected to the processor, wherein the memory may store instructions, when executed, causing the processor to request a management server to encrypt a push key received from a push server, using the communication circuit, in response to the request, receive an encrypted push key from the management server, generate at least one transaction based on the encrypted push key, and transmit the transaction to a blockchain network.

In an embodiment of the disclosure, the transaction may further include an address of the electronic device and an address of a smart contract.

In an embodiment of the disclosure, the electronic device may further include a display, wherein the instructions may, when executed, cause the processor to, display a user interface related to a smart contract on the display, and, in response to a user input on the user interface, request a push key from the push server.

In an embodiment of the disclosure, the instructions may, when executed, cause the processor to receive a user input which selects a first push server among a plurality of push servers, in response to the user input, request the push key from the first push server, in response to receiving the push key from the first push server, request the management server to encrypt the push key received from the first push server, and in response to the push key encryption request, receive the encrypted push key from the management server.

In an embodiment of the disclosure, the instructions may, when executed, cause the processor to receive a push message from the management server via the first push server.

In an embodiment of the disclosure, the instructions may, when executed, cause the processor to receive a user input which selects a first management server among a plurality of management servers, and in response to the user input, request the first management server to encrypt the push key received from the push server.

An electronic device according to an embodiment may include a communication circuit configured to communicate, a processor operatively connected to the communication circuit, and a memory operatively connected to the processor, wherein the memory may store instructions, when executed, causing the processor to request a management server to encrypt a push key received from a push server, using the communication circuit, in response to the request, receive an encrypted push key from the management server, and in response to a push event occurrence based on a smart contract, receive a push message associated with the push event from the management server via the push server.

An electronic device according to an embodiment may include a communication circuit configured to communicate, a processor operatively connected to the communication circuit, and a memory operatively connected to the processor, wherein the memory may store instructions, when executed, causing the processor to identify a push event related to a smart contract recorded in at least one block managed by a blockchain network, using the communication circuit, decrypt at least one push key related to the push event, and transmit the at least one decrypted push key and a push message to at least one external electronic device corresponding to the at least one decrypted push key, using a push server.

In an embodiment of the disclosure, the instructions may, when executed, cause the processor to identify a push event related to an address of the smart contract among push events related to at least one smart contract recorded in the at least one block based on the address of the smart contract.

In an embodiment of the disclosure, the instructions may, when executed, cause the processor to identify a push event based on information indicating an event type among a plurality of events related to an address of the smart contract.

In an embodiment of the disclosure, the instructions may, when executed, cause the processor to, in response to identifying the push event, identify at least one recipient address in the push event, and in response to identifying the at least one recipient address, receive the at least one encrypted push key corresponding to the at least one recipient address, from the blockchain network.

In an embodiment of the disclosure, the instructions may, when executed, cause the processor to receive data indicating the smart contract from a first external electronic device, identify whether the data is in a designated format, and in response to identifying whether the data is in the designated format, identify the push event.

In an embodiment of the disclosure, the address of the smart contract may be generated if a first external electronic device deploys data indicating the smart contract in the blockchain network.

In an embodiment of the disclosure, the instructions may, when executed, cause the processor to receive an address of the smart contract from a second external electronic device, and based on the address of the smart contract, identify the push event related to the smart contract recorded in the at least one block managed by the blockchain network, using the communication circuit.

In an embodiment of the disclosure, the instructions may, when executed, cause the processor to, in response to receiving the address of the smart contract from the second external electronic device, generate an encryption key related to the smart contract.

In an embodiment of the disclosure, the instructions may, when executed, cause the processor to decrypt the at least one push key, based on the encryption key.

A computer-readable recording medium according to an embodiment may record a program for recording an address of at least one external electronic device and an encrypted push key for the at least one external electronic device in a block of a blockchain network, recording a push event in a block of the blockchain network, the push event including the address of the at least one external electronic device, an address of a smart contract, and a push message, recording the push event in the block and then receiving a transmission request of an encrypted push key corresponding to an address of a first external electronic device from a management server, and in response to receiving the transmission request of the encrypted push key, transmitting the encrypted push key corresponding to the address of the first external electronic device, to the management server.

In an embodiment of the disclosure, the computer-readable recording medium may record the program for further receiving a transaction including a smart contract from a first external electronic device, and recording the transaction in a block of the blockchain network, and recording the address of the smart contract.

In an embodiment of the disclosure, the computer-readable recording medium may record the program for further, in response to receiving the transmission request of the encrypted push key, identifying authority of the management server, and in response to identifying that the authority of the management server is designated authority, transmitting the encrypted push key corresponding to the address of the first external electronic device, to the management server.

In an embodiment of the disclosure, the encrypted push key may be encrypted by the management server.

In an embodiment of the disclosure, the smart contract may include a program code for recording and executing the smart contract between contracting parties.

In an embodiment of the disclosure, the address of the smart contract may be generated when the smart contract is recorded in the block of the blockchain network.

Methods according to an embodiment of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

Further, either multiple elements expressed in the description may be configured into a single element or a single element in the description may be configured into multiple elements.

While the disclosure has been illustrated and described with reference to various embodiments thereof, it will be understood by those skilled in the art that various changes in form and details may be made therein without departing from the true spirit and full scope of the disclosure as defined by the appended claims and their equivalents.

What is claimed is:

1. An electronic device comprising:
a communication circuit configured to communicate;
at least one processor operatively connected to the communication circuit; and
a memory operatively connected to the at least one processor,
wherein the memory stores instructions that, when executed, cause the at least one processor to:
request a push server to generate a push key,
transmit, to a management server, a request to encrypt the push key received from the push server, using the communication circuit,
in response to the request, receive the encrypted push key from the management server,
generate at least one transaction based on the encrypted push key, the at least one transaction comprising data associated with requesting a push service registration to a blockchain network,
transmit the at least one transaction to a blockchain network to record the encrypted push key in at least one block of the blockchain network, and
in response to a push event occurrence based on a smart contract, receive a push message associated with the push event from the management server via the push server based on the encrypted push key recorded in the at least one block.

2. The electronic device of claim 1, wherein the at least one transaction further comprises:
an address of the electronic device, and
an address of a smart contract.

3. The electronic device of claim 1, further comprising:
a display,
wherein the instructions, when executed, further cause the at least one processor to:
display a user interface related to a smart contract on the display, and
in response to a user input on the user interface, request the push key from the push server.

4. The electronic device of claim 1, wherein the instructions, when executed, further cause the at least one processor to:
receive a user input which selects a first push server among a plurality of push servers,
in response to the user input, request the push key from the first push server,
in response to receiving the push key from the first push server, request the management server to encrypt the push key received from the first push server, and
in response to the push key encryption request, receive the encrypted push key from the management server.

5. The electronic device of claim 1, wherein the instructions, when executed, further cause the at least one processor to:
receive a user input which selects a first management server among a plurality of management servers, and
in response to the user input, request the first management server to encrypt the push key received from the push server.

6. An electronic device comprising:
a communication circuit configured to communicate;
at least one processor operatively connected to the communication circuit; and
a memory operatively connected to the at least one processor,
wherein the memory stores instructions that, when executed, cause the at least one processor to:

in response to receiving a push key encryption request directly from at least one external electronic device, encrypt the push key related to a smart contract, the push key being included in the push key encryption request, identify a push event related to the smart contract recorded in at least one block managed by a blockchain network in which a push service is registered based on at least one transaction transmitted from an external electronic device, using the communication circuit, in response to identifying the push event, decrypt at least one encrypted push key related to the push event, and transmit the at least one decrypted push key and a push message to the at least one external electronic device corresponding to the at least one decrypted push key, using a push server.

7. The electronic device of claim 6, wherein the instructions, when executed, further cause the at least one processor to:
identify a push event related to an address of the smart contract among push events related to at least one smart contract recorded in the at least one block based on the address of the smart contract.

8. The electronic device of claim 6, wherein the instructions, when executed, further cause the at least one processor to:
identify a push event based on information indicating an event type among a plurality of events related to an address of the smart contract.

9. The electronic device of claim 6, wherein the instructions, when executed, further cause the at least one processor to:
in response to identifying the push event, identify at least one recipient address in the push event, and
in response to identifying the at least one recipient address, receive at least one encrypted push key corresponding to the at least one recipient address, from the blockchain network.

10. The electronic device of claim 6, wherein the instructions, when executed, further cause the at least one processor to:
receive data indicating the smart contract from a first external electronic device,
identify whether the data is in a designated format, and
in response to identifying whether the data is in the designated format, identify the push event.

11. The electronic device of claim 6, wherein an address of the smart contract is generated when a first external electronic device deploys data indicating the smart contract in the blockchain network.

12. The electronic device of claim 6, wherein the instructions, when executed, further cause the at least one processor to:
receive an address of the smart contract from a second external electronic device, and
based on the address of the smart contract, identify the push event related to the smart contract recorded in the at least one block managed by the blockchain network, using the communication circuit.

13. The electronic device of claim 12, wherein the instructions, when executed, further cause the at least one processor to:
in response to receiving the address of the smart contract from the second external electronic device, generate an encryption key related to the smart contract.

14. The electronic device of claim 13, wherein the instructions, when executed, further cause the at least one processor to:
decrypt the at least one encrypted push key, based on the encryption key.

* * * * *